United States Patent
Panetta

(10) Patent No.: US 9,036,894 B2
(45) Date of Patent: *May 19, 2015

(54) DISPENSARY EMBOSSED CHARACTER CONTAINER LABELING

(71) Applicant: MEDAVAIL, INC., San Francisco, CA (US)

(72) Inventor: Richard Panetta, Milton (CA)

(73) Assignee: MEDAVAIL, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/070,974

(22) Filed: Nov. 4, 2013

(65) Prior Publication Data

US 2014/0185917 A1    Jul. 3, 2014

Related U.S. Application Data

(63) Continuation of application No. 12/642,786, filed on Dec. 19, 2009, now Pat. No. 8,577,145.

(51) Int. Cl.
| | |
|---|---|
| *G06K 9/62* | (2006.01) |
| *A47F 1/04* | (2006.01) |
| *G06K 7/10* | (2006.01) |
| *G06K 7/12* | (2006.01) |
| *G06K 9/20* | (2006.01) |
| *G06K 15/02* | (2006.01) |
| *G06K 9/03* | (2006.01) |

(52) U.S. Cl.
CPC ............. *A47F 1/04* (2013.01); *G06K 7/10712* (2013.01); *G06K 7/12* (2013.01); *G06K 9/03* (2013.01); *G06K 9/2018* (2013.01); *G06K 9/2036* (2013.01); *G06K 2209/01* (2013.01); *G06K 9/62* (2013.01); *G06K 15/024* (2013.01)

(58) Field of Classification Search
CPC ........... G06K 9/00; G06K 9/18; G06K 9/183; G06K 9/2054; G06F 3/018
USPC .................................. 382/181–189, 141–143
See application file for complete search history.

(56) References Cited

U.S. PATENT DOCUMENTS

| | | | | |
|---|---|---|---|---|
| 5,337,370 A | * | 8/1994 | Gilles et al. | 382/102 |
| 2008/0063280 A1 | * | 3/2008 | Hofman et al. | 382/182 |

* cited by examiner

*Primary Examiner* — Ruiping Li
(74) *Attorney, Agent, or Firm* — Bradley K. DeSandro; Desandro Law Group PLLC

(57) ABSTRACT

In a method and apparatus for identifying an embossed character, light of one color is directed in one direction across the embossed character to illuminate certain character parts and light of another color is directed in another direction across the embossed character to illuminate other character parts. Image data for the two colors are captured and are subjected to separate image processing to detect edges highlighted by the directed light. The processed images are combined and supplemented with OCR analysis before being compared with predicted characters. Based on the comparison, a determination is made as to the probable identity of the character.

20 Claims, 5 Drawing Sheets

FIG. 10
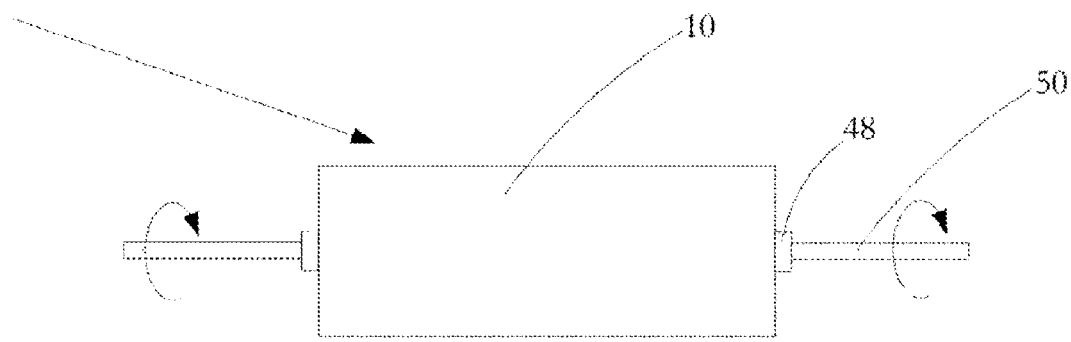
FIG. 11
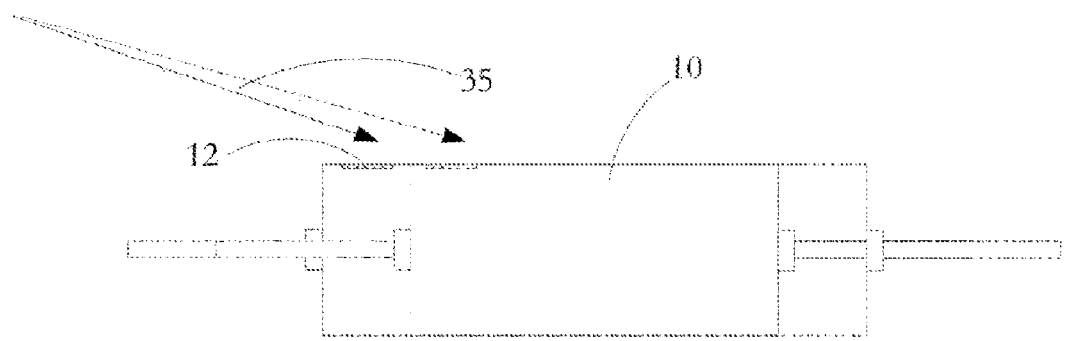
FIG. 12
FIG. 13

DISPENSARY EMBOSSED CHARACTER CONTAINER LABELING

RELATED APPLICATIONS

This application claims priority to U.S. patent application Ser. No. 12/642,786, titled "Automated Dispensary for Identifying Embossed Characters and Package Labeling," filed on Dec. 9, 2009, now U.S. Pat. No. 8,577,145.

FIELD

This invention relates to a method and apparatus for identifying embossed characters. The invention has particular but not exclusive application to identifying lot and expiry data formed in the surface of drug packages at an automated drug dispensary or kiosk.

BACKGROUND

A preferred automated dispensary design is described in our copending application U.S. patent application Ser. No. 12/541,307 which is hereby incorporated by reference in its entirety. The dispensary comprises a rack assembly of storage bins having a back wall, a series of vertical slots in the back wall, and partition members having tongues for fixing the partition member to the back wall. Extending between the partition members are bin floors, the edges of the floor members located in slots in the partition members. The spacing of the slots in the back wall and of the slots in the partition members is selected to permit a range of spacings of horizontally adjacent partition members and a range of spacings of vertically adjacent floor members. By suitable selection of the spacings, a large variety of bin sizes can be obtained.

Referring in detail to FIG. 14, which corresponds to FIG. 1 in our copending application U.S. patent application Ser. No. 12/541,307, a cabinet 10 for a dispensing kiosk is shown. The cabinet has a rack 11 of storage bins 12 arranged in a row and column array. The bins vary in shape and size to accommodate different sizes of packages to be dispensed. Particularly for the application envisioned for the present invention, the rack of storage bins is formed as a secure back end medicament storage vault. The storage vault is, in use, combined with a front end unit (not shown) which bars unauthorized access to the drug vault but which can be opened to expose the drug vault for servicing. Mounted in the front end unit is an interface unit (not shown) at which a user, can enter data, communicate with a remote expertise or data records through a data or teleconference link, and collect dispensed packages, etc. As shown in FIG. 14, a pick head 20 is mounted on a vertically reciprocable carriage 21 which is driven by a belt drive 22 along a vertical guide rail 23. The rail 23 is mounted between two linked, horizontally reciprocable carriages 24. The carriages 24 are driven by a belt drive 26 along horizontal rails 28. The carriages 21 and 24 are movable in a plane which extends parallel to a front access side 19 of the bin rack 11. In this way, the pick head 20 can be placed adjacent any selected one of the bins 12 at the front access side 19 of the bin rack. The pick head is used to pick a chosen package from its position in the rack of bins and, if part of a stack or row of packages, from its position within the stack or row, in preparation for dispensing the package at an access bay in the front end interface unit. Optionally, the pick head can also be used to load medicament packages in a bin in a reverse process. Particular pick head mechanisms for use with the illustrated rack of the present invention are described in applicant's copending U.S. patent application Ser. No. 12/503,989. The rack has a series of vertical partition members 30, in a form assembled as part of the storage apparatus. As per applicant's copending PCT application serial no. PCT/CA2007/001220 related to a method, system and apparatus for dispensing drugs, an automated apparatus is disclosed from which medicaments can be automatically dispensed. More specifically, the PCT application describes a networked system having a server, a database of patient information linked to the server, a first client having input means linked to the server and operable to generate a script for a medicament prescribed to a user, a second client comprising an automated apparatus for dispensing medicaments (referred to in said PCT application as a robotic prescription dispensary) operable to recognize a human and/or machine readable description in the script, and to provide validating cross-referencing between the description and patient information as a prelude to dispensing a drug to the user on the basis of the input script. The apparatus interfaces with the server to transact a payment, for example, by prompting the patient for credit card information. Prescription labels and receipts are printed. The apparatus confirms that the drug is correct and delivers it to a dispensing area for retrieval by the user while retaining the script in a lock box, and verifying that the purchased drug product has been retrieved. Further, the apparatus may print and/or provide to the user educational materials relevant to the medicaments that have been dispensed. The automated dispensing apparatus for is of significant value in enabling a patient to obtain prescribed medicaments without having to attend a pharmacy or drug store.

In preparation for dispensing drug packages from the automated dispensary, dispensary rack bins are filled with products and an accurate record is made during the process of loading to identify exactly what products are stored in what bins. Form knowledge of the identity and whereabouts of all products in inventory, the inventory is pro-actively managed. This involves regularly checking through an index of lot numbers and expiry dates and discarding any products which are close to the expiry date, reviewing suppliers recall notices and discarding any drugs identified by suppliers as being recalled, and periodically rotating stock between different kiosks to match inventory to market expectations. Such knowledge is also used to ensure methodical and accurate handling of products from the moment that drug packages arrive for loading in the automated dispensary to the moment a particular drug package is dispensed to a user or is otherwise disposed of A prime objective is to have complete assurance at all times as to the whereabouts of all products that have been loaded into the dispensary, and to know exactly what is in each rack bin.

To achieve such assurance, important characterizing information for a drug package must be identified before it is loaded into the dispensary in a serialization process. Such information might include, for example, the nature of the drug, manufacturer, lot number, expiry date and handling instructions. Typically, such data is applied to the drug package at a prior juncture in the supply chain; for example, by the manufacturer shortly before the drug package exits the manufacturing facility. The characterizing information may also include physical data such as weight, shape and size of the package. Such physical data is normally not evident from a visual inspection of the drug package as it is received for dispensary loading, but must be generated by measuring or otherwise physically inspecting the drug package before it is loaded into the dispensary.

To identify a particular product during subsequent handling of the product in the dispensary, the characterizing data is again read at whatever location in the dispensary identification of the product needs to be made. The characterizing data is read, for example, by optical character recognition (OCR) equipment. In addition, the physical parameters of the package, such as its weight and size, are also measured at the location to obtain further evidence that the package has been correctly identified and has not been tampered with.

As part of the serialization process, an imaging process is performed in which multiple images are recorded of each drug package as a prelude to it being loaded into a storage bin. The images are analyzed to derive the initially present characterizing data, this being used to identify the nature of the package at the time of serialization and to provide assurance as to what package is being handled during, for example, a subsequent dispensing process. The images may include images of each face of the package, which is typically a box, but which may be another suitable container such as a bottle or canister. As part of the imaging process, printed data is captured and analyzed using conventional OCR equipment. Illuminating sources of different colors are preferably used as this enables corresponding analyses of the separate color images to be performed. Illuminating and image capture at different colors is of value because, for example, the degree of contrast between a printed character's foreground and background colors is dependent on relative absorption and reflection which, in turn, may be a function of the illuminating colors. In a preferred arrangement, the package to be analyzed is maneuvered through a series of positions to derive a range of images for subsequent processing. For example, the package is gripped at contact points and is spun around an axis extending between the contact points to present each face in turn to one or more light sources and/or one of more cameras forming part of the imaging system. Alternatively, or in addition, any one of a plurality of cameras may have its settings adjusted, or may be moved or selected so as to obtain a range of images.

Characterizing data required by the automated dispensary for effective handling of a drug package ideally has a standardized position, content and format. For example, all information is printed black on white and all alphanumeric characteristics are of a single font type, stroke width, size and spacing. In fact, labelling of commercial drug packages is rarely standardized to this extent.

To achieve consistency of presentation of characterizing data for future product handling, any supplied product can be manually analyzed to derive the characterizing data, following which, the characterizing data is applied to the package as a label. The applied labels for all products which are to be loaded into the automated dispensary can be prepared to have the desired standardized position, content and format regardless of the degree of variation in the drug labelling on packages as they are originally received from the supplier.

In a more convenient method, the characterizing data is coded into a machine-readable tag, such as a bar code or a radio frequency identification tag, which is attached to the drug package and has a standardized location and format. The tag is subsequently monitored by appropriate machine reading units as the package is handled in the dispensary throughout the storage and dispensing process. The use of such tags reduces the processing required in comparison with having to identify in real time during subsequent drug package handling many data elements from a label displaying the characterizing data.

In an alternative auto-serialization method, display data applied to a package is automatically read from the drug product as supplied and is used directly to code a machine readable tag applied to the product. Such an auto-serialization method clearly saves in the loading process time and expense as it simply reuses the serialization work done earlier in the supply chain. As previously mentioned, one problem with automatically reading data on the supplied product is that there may be significant variation depending on the manufacturer, regulatory requirements in different jurisdictions, etc. Consequently, data elements may be in a variety of positions, foreground/background color combinations, font type, size and stroke width, etc.

Of particular interest are data elements which are not displayed on a label applied to the supplied product, but which are embossed on the product package itself. The use of embossing is common for recording two very important elements: lot number and expiry date. Reading embossed text with a conventional OCR reader is difficult because embossed characters having the same identity can differ considerably in terms of uniformity, depth of struck characters, foreground/background color combinations, foreground/background contrast, etc. In spite of limitations of machine reading embossed characters, it has been found that human operators can discern data in an image of embossed characters in all but the most difficult cases, showing that identity characteristics are present if the right reading method and apparatus are applied. A high success rate for reading by known automated readers is however currently achievable only with the most sophisticated and expensive OCR equipment. Particularly for an automated drug dispensary kiosk, a relatively inexpensive and rapid method for identifying embossed characters is required.

SUMMARY

According to one aspect of the invention, there is provided a method of identifying an embossed character comprising directing first light in a first direction across the embossed character to illuminate first parts of the character, recording first image data representing the character illuminated by the first light, directing second light in a second direction across the embossed character to illuminate second parts of the character, recording second image data representing the character illuminated by the second light, combining the first image data and the second image data to produce combined image data, comparing the combined image data to reference data, and on the basis of the comparison identifying the character.

Preferably, the first light has a first color and the second light has a second color, with each of the first and the second light being directed at a low angle of incidence to a plane of a surface within which the embossed character is formed, and the first direction preferably being orthogonal to the second direction.

The method can further comprise subjecting each of the first and second images to image processing prior to combining the first and second image data, such image processing including detecting character edges. The method can further comprise obtaining a supplementary image of the character using, for example, an optical character recognition technique using incident white light, processing data representing the combined image with data representing the supplementary image, and based on the processed data, identifying the character. The method can further comprise comparing the combined image data with predicted image data to derive a recognition confidence factor depending on a degree of matching of the combined image data to the predicted image data, and applying iterative feedback to adjust any of the illuminating conditions and any of the imaging conditions, whereby to maximize the recognition confidence factor. The method can further comprise adjusting at least one of incrementally adjusting the package position and orientation under feedback control to maximize the recognition confidence factor.

According to another aspect of the invention, there is provided a system for identifying an embossed character comprising an illumination module for directing first light in a first direction across the embossed character to illuminate first parts of the character and for directing second light in a second direction across the embossed character to illuminate second parts of the character, and an image capture module for recording first image data representing the character illuminated by the first light and recording second image data representing the character illuminated by the second light, and an image processing sub-system having a filtering module to filter the first image data to obtain first edge data corresponding to the light directed in the first direction and to filter the second image data to obtain second edge data corresponding to the light directed in the second direction, a combining module for combining the first image data and the second image data to produce combined image data, and an identification module to identify the character from the combined image data.

BRIEF DESCRIPTION OF THE DRAWINGS

For simplicity and clarity of illustration, elements illustrated in the following figures are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 10 shows an image derived by combining the images of FIGS. 7 and 9;

FIG. 11 shows the FIG. 10 image following image inversion;

FIG. 12 shows an imaging arrangement for obtaining multiple images of a package according to an embodiment of the invention;

FIG. 13 shows an imaging arrangement for obtaining multiple images of a package according to another embodiment of the invention.

DETAILED DESCRIPTION

Figure 1:
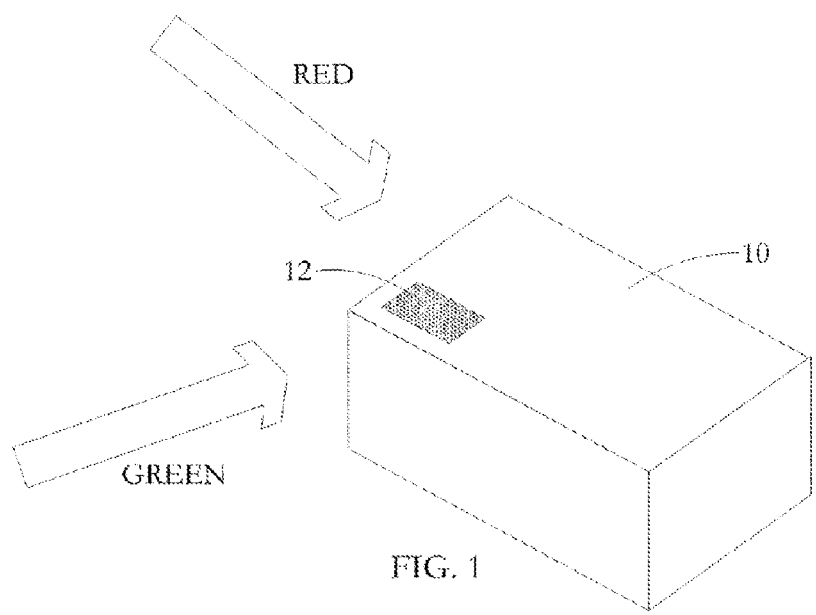
FIG. 1 is a perspective view of a drug package presented for autoserialization according to an embodiment of the invention.

Referring in detail to FIG. 1, there is shown a drug package 10 that has been brought to an identification station at which the nature of characterizing data on the drug package is to be analyzed. As part of the process of analyzing the characterizing data, one or more images of each face of the package are obtained, including any face on which written or illustrated data is directly printed or onto which a printed label is attached. In addition, an OCR reader is used to read printed, machine-readable text and also to function as part of the identification of embossed characters as will be described presently.

The drug package 10 shown in FIG. 1 has an embossed element 12. Frequently, embossed elements may not be clear enough to be read using conventional OCR readers except in the case of sophisticated and expensive OCR systems. To read the embossed script, either as a substitute for conventional OCR reading or to supplement data derived from conventional OCR reading, an embossed script identification system is used.

Figure 2:
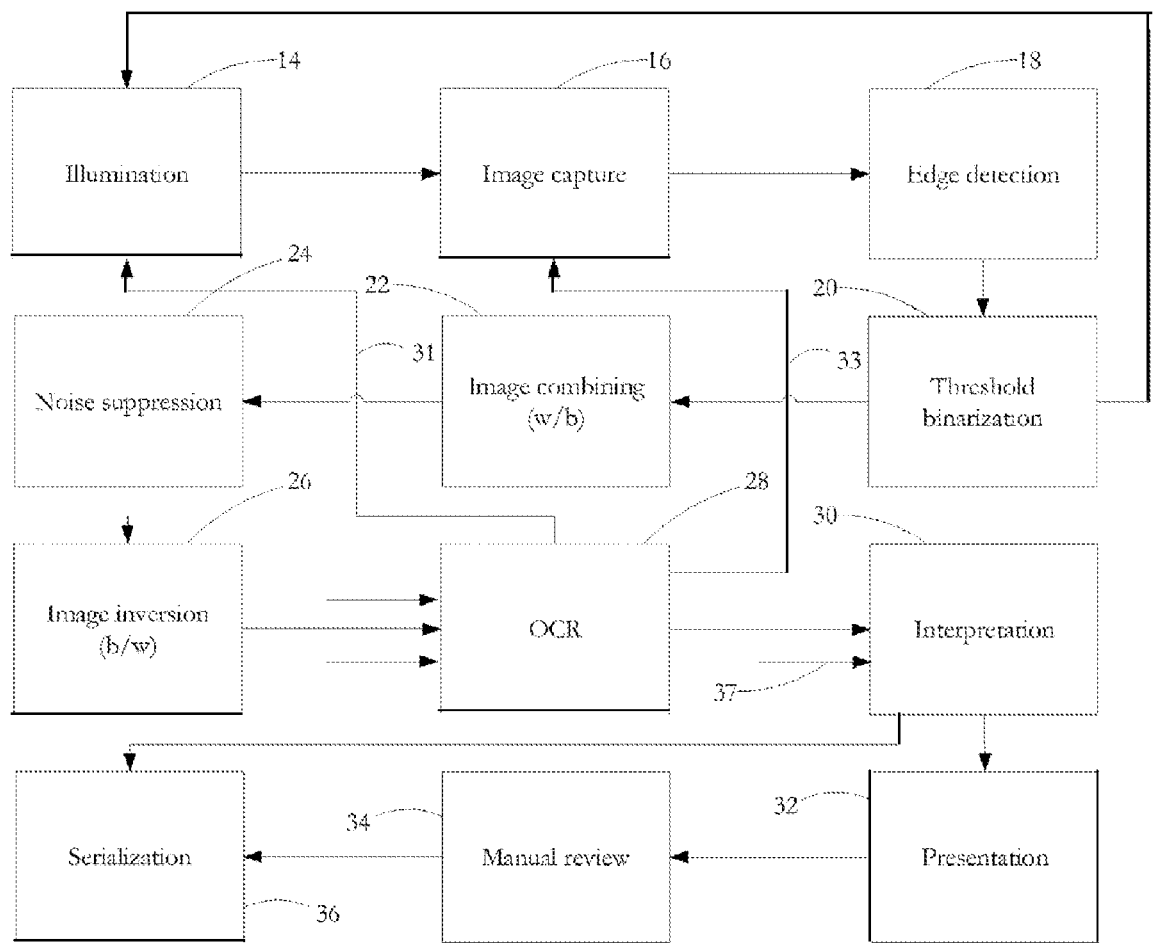
FIG. 2 is a schematic diagram showing stages in an embossed character identification method according to an embodiment of the invention.

As shown in FIG. 2, the embossed script identification system includes an illumination module 14, an image capture module 16 and a series of image processing modules comprising an edge detection module 18, a threshold binarizing module 20, an image combining module 22, a noise suppression module 24 and an image conversion module 26. An output from the image processing modules is fed to an OCR module 28. The system also includes an interpretation module 30, a presentation module 32, a manual inspection station 34 and a serialization module 36.

Figure 3:
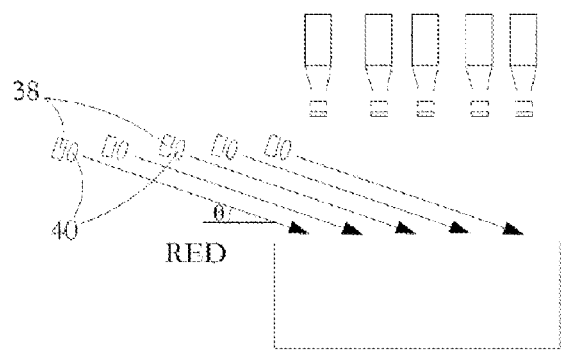
FIG. 3 is a side view of the drug package of FIG. 1 showing incident red light directed across a surface of the package.
Figure 5:
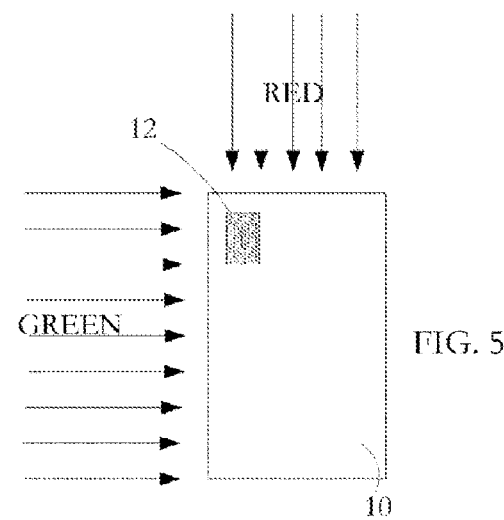
FIG. 5 is a top view of the package of FIG. 1.
Figure 4:
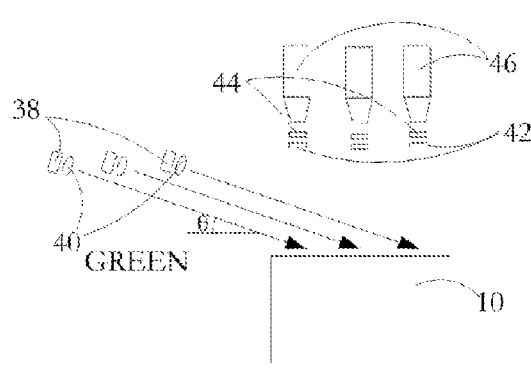
FIG. 4 is an end view of the drug package of FIG. 1 showing incident green light directed across the surface of the package.

As shown in FIGS. 3 to 5, the illumination module includes red and green light sources each comprising an array of LEDs 38. Light emitted from each LED is focused at a corresponding lens 40 to direct the light onto a particular face of at a low angle (.theta.) to the package surface. The array of LEDs and the associated focusing optics ensure a wide footprint for the illumination module so that, regardless of position on the package surface, a substantially focused beam is incident on each character so as to generate highlighted and shadowed areas at the character. With the drug package orientated at a first selected position in the test bay to expose the embossed region, the red light source is located at the top of the drug package and sends a light beam vertically across the face of the package as shown in FIGS. 3 and 5. The green light source is located at one side of the package and sends a low angle light beam horizontally across the face as shown in FIGS. 4 and 5.

Light from the illuminated package surface is directed through polarizing filters 42 to reduce glare and through red and green color filters 44 into respective cameras 46 to develop separate images corresponding to the red and green light sources. As shown by the images of the embossed region in FIG. 6, corresponding to the red beam, and in FIG. 7, corresponding to the green beam, certain features of the embossed characters are highlighted as brightly illuminated or deeply shadowed depending on the identity of the particular embossed character and the direction of the light beam.

Figure 6:
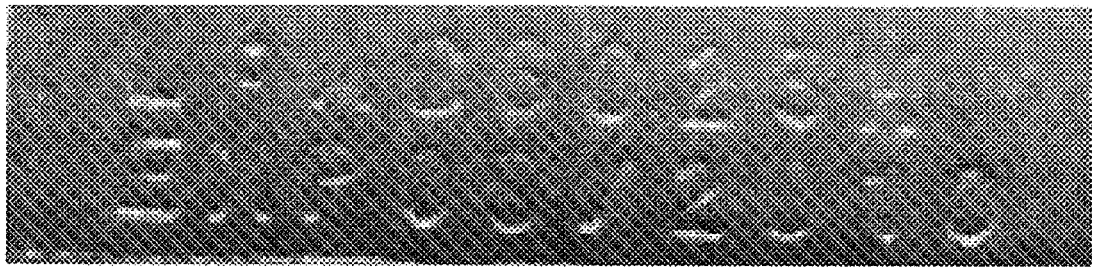
FIG. 6 shows an image of the surface of the package of FIG. 1 derived by filtering through a red filter.
Figure 7:
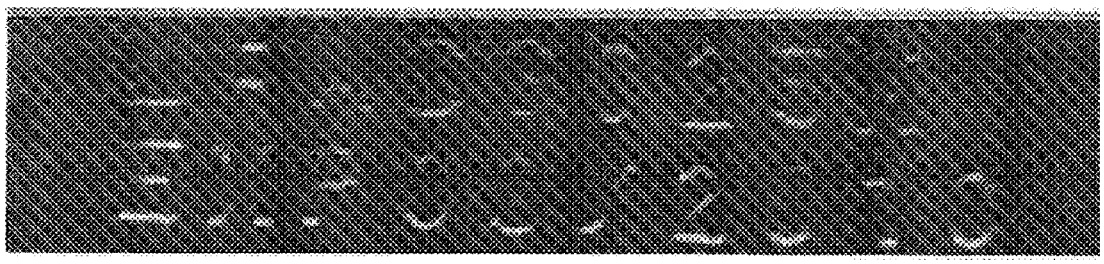
FIG. 7 shows the image of FIG. 6 following image processing to highlight generally horizontal edges according to an embodiment of the invention.
Figure 8:
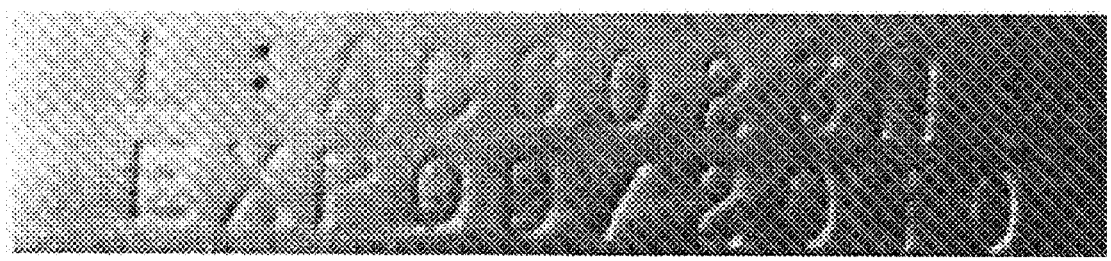
FIG. 8 shows an image of the surface of the package of FIG. 1 derived by filtering through a green filter

Illumination conditions, such as light intensity and beam direction, and camera settings, such as brightness, contrast, exposure, gain, focus, color saturation, zoom, pan and image sharpness, are chosen to increase the clarity of the images. Image data obtained from the cameras 46 and corresponding to the images of FIGS. 6 and 7 are then processed. The images at the selected colors are analyzed to identify points in each image corresponding to large discontinuities in image brightness. These discontinuities, if they correspond to changes in depth, may signify stroke edges of embossed alphanumeric characters. In the particular representation of data shown in FIGS. 6 and 8 and considering the "0" character at bottom right, it can be seen that the red lighting accentuates edges that extend generally horizontally and the green lighting accentuates edges that extend generally vertically.

Knowing the direction associated with each of the illuminating colors, heuristic strategies are used in filtering each of the red and green layers of image data.

In this respect, algorithms for detecting an edge in image data are known and commercially available in software applications. A particularly useful software application is DotImage Version 4.0, available from Atalasoft, which incorporates tools applicable to the auto-serialization method described, including edge detection, noise filtering, image enhancement and OCR. For the edge detection, a Sobel edge detection filter yields good results with low processing load which is important to the use of iterative looping to improve image sharpness. The Sobel filter is a convolution filter which uses separate horizontal and vertical passes, so complementing the red/green illumination approach of this embodiment. It will be appreciated however that as an alternative to the exemplary filter, other filters such as Laplacian of Gaussian (LoG), Authentic LoG, Canny, and functional approximation, can be used for embossed characters having characteristics making such an alternative filter particularly useful. While algorithms underpinning these filters are based on measuring intensity differences, other commercially available software is available which have outputs depending on intensity ratios.

Figure 9:
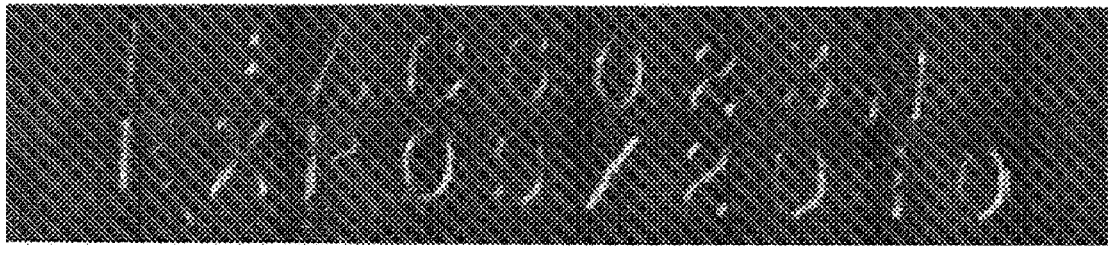
FIG. 9 shows the image of FIG. 8 following image processing to highlight vertical edges according to an embodiment of the invention.
Figure 14:
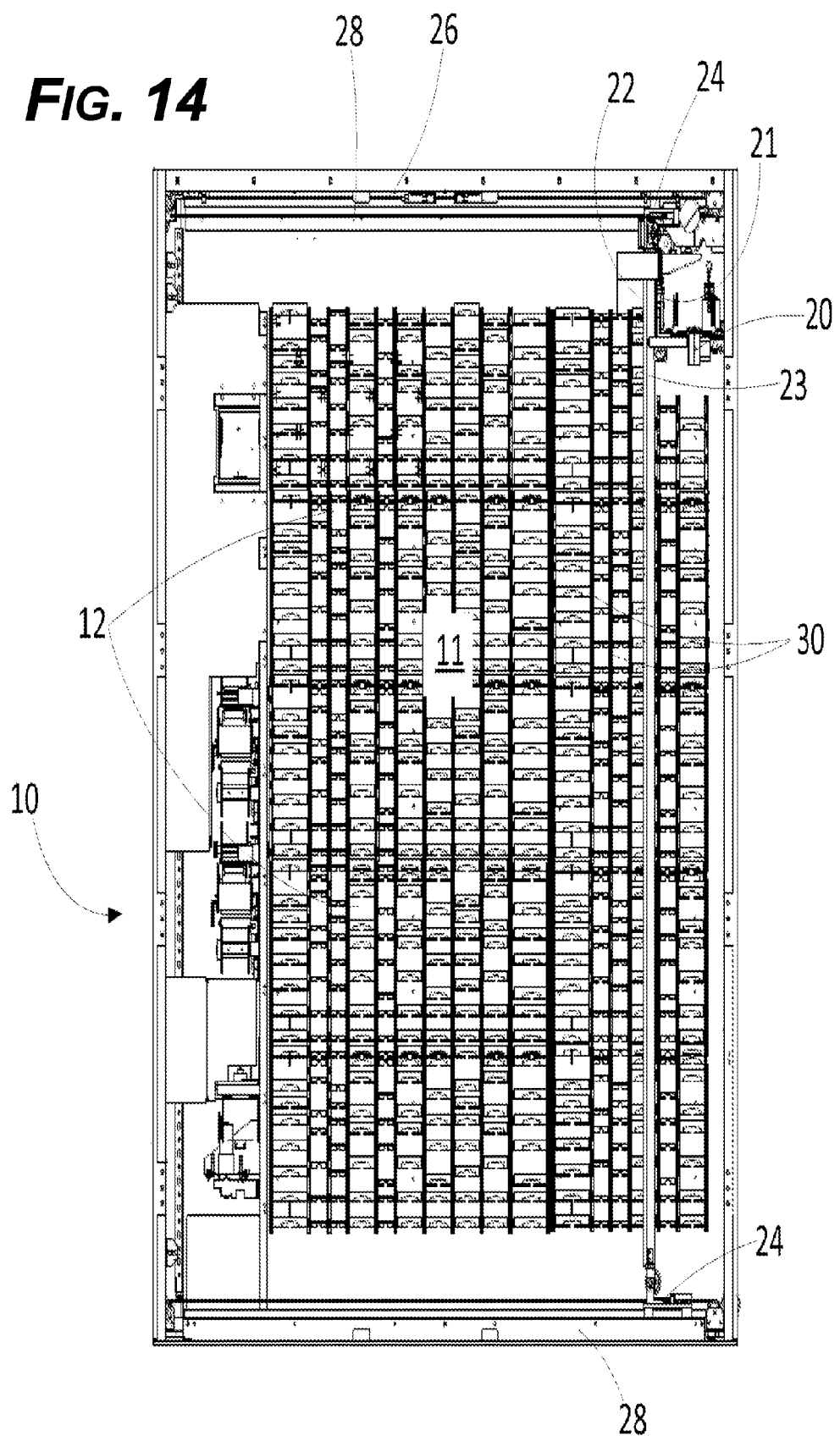
FIG. 14 is a front view of a storage apparatus for a package dispensing kiosk according to one embodiment of the invention.

The image data is then subjected to a threshold binarizing at the module 20 in which either side of a threshold level, low and high levels of intensity are converted to black and white to produce image data corresponding to images of the form illustrated in FIG. 7, derived from the red light, and FIG. 9, derived from the green light. Following binarizing, data representing the two black and white images are combined at the combining module 22 to produce image data representing the merged image illustrated in FIG. 10 in which the image elements of each character appear as white strokes on a black background.

The image data is subjected to further filtering, such as Gaussian filtering, at the noise suppression module 24 to remove noise with the output of the noise suppression module being fed to an inversion module 26 to invert the image data, the inversion stage having output image data representing a black on white image as shown in FIG. 11. The output from the inversion stage is then fed to the OCR processing module 28. The input from the inversion stage to the OCR processing module can be either the sole input to this module or, as shown, can be one of a number of inputs to the OCR processing module for image data related to the character to be identified that has been obtained by additional means. The OCR module processes the inputs and outputs data representing the identity of the characters together with data representing the character locations positions, and associated data representing the confidence level that an identification of a character is correct.

The OCR output data is subsequently subjected to interpretation analysis at the interpretation module 30. One objective of the interpretation analysis is to identify edges that may appear fragmented in the detected edge related data because, for one reason or another, the edge is present but data corresponding to the edge is intermittent along the edge length. In this case, an edge is presumed if there is a threshold level of data signifying the edge. In addition, the interpretation analysis is used to identify apparent edge data which in fact signify a false edge. In this latter case, the false edge data is discarded.

Feedback from the image processing is used for closed-loop analog tuning of the illumination and imaging conditions. This is achieved by obtaining a rapid succession of images, scoring the quality of the images in terms of accurately detecting the characters in the images, and tuning the imaging conditions optimally to maximize the scores. The score from the OCR module 28 is used in primary loop feedback 31, 33 to the illumination and image capture modules 14, 16 respectively to control, for example, the intensity and direction of each colored light source, and to control various camera settings. This score is used as error factor in a succession of PID (Proportional-Integral-Deriverative) calculations to improve the score, with an optimal score being used as the basis for selecting final input data to the OCR module. The OCR feedback can be used both in real time to improve the imaging score but when initially selecting illumination and imaging conditions for packages of the same type as the package being analyzed. The primary loop feedback can be combined with secondary loop feedback from one or more of the processing modules preceding the OCR module. In the example shown in FIG. 2, secondary loop feedback is taken from the threshold binarization module 20 to the illumination module 14 to adjust illumination and camera settings on the basis of the binarized image before the OCR processing is performed. Among the camera settings that are adjusted to improve image clarity are saturation, focus, brightness, contrast, exposure and gain. An important additional adjustment is to determine which of the available cameras are operated. For example, if the package is a bottle which will invariably have no information of interest on the top or the bottom, then cameras occupying positions adjacent the bottle top and bottom may be switched off In another cascaded feedback arrangement, the imaging system is tuned to first identify the existence of any UPC (universal product code) barcode on the package as obtained from the supplier. The barcode is read and by reference to a product database, information related to the initial orientation of the package and the expected position of other data elements on the packages is derived. That information is then used as initial feedback to modify the product manipulation and the illumination and camera settings with a view to obtaining rapid and clear capture of relevant image data.

When the score is at a maximum, the output from the OCR processing module 28 is fed to an interpretation stage 30. The interpretation stage also includes an input 37 related to permitted and likely formats and content for the characters and character sets which are expected to be read from the drug package. These may include, for example, particular sequences of alphanumeric characters that normally signify a lot number or an expiry date; or the presence of separation spacing and characters between character strings of interest; or a particular format required by government regulations. The OCR output data is compared with the permitted and likely formats to increase the confidence level. On the basis of a comparison between the OCR output and the expected data inputs at the confirmation module, recognized OCR outputs are confirmed as valid.

A resulting image of a particular multi-character embossed element may have several characters which have been recognized with a high degree of confidence together with one or more characters where either the character has not been identified or the character has been identified with a low level of confidence. In response to such a situation, the output of the comparator stage is taken to a presentation module where the image depicted by FIG. 10 is generated and is marked to highlight any character whose identity is in question. The marked image is presented at a manual inspection station where an operator visually identifies the questionable character. The manual inspection can either take place where auto-serialization and loading are taking place or the image data is captured and transmitted to a remote location where manual inspection may take place for a number of dispensaries connected by a communications network.

The output of the confirmation module, improved if necessary by being cycled through the manual inspection station, is then used to develop data input at the serialization stage where standard format data is applied to the package itself or to a label to be applied to the package. The data may be written data or may be coded as a bar code or radio frequency tag with data encoded in the RFID tag or barcode signifying all relevant data that is obtained as a result of the analysis. Modules for applying such labels, bar codes, or radio frequency ID tags are not shown.

While the above embodiment of the invention describes the use of light of different colors, other methods of obtaining selective orientation-related illumination in conjunction with a corresponding selective analysis can be used. For example, in an alternative embodiment, a first light pulse is directed vertically across the package surface in one time interval and then a second light pulse is directed horizontally across the package surface in a subsequent time interval. In analyzing image data, image data corresponding to the first time interval is filtered to highlight artifacts produced by the vertically directed light, and image data corresponding to the subsequent time interval is filtered to highlight artifacts produced by the horizontally directed light.

It will be appreciated that the particular beams do not need to be red and green and nor do the light beams need to be confined to vertical and horizontal directions in relation to the orientation of the drug package. Thus, other distinguishing colors or light characteristics can be used to provide contrast between one reading showing one set of prominent and shadowed regions of an embossed character and another reading showing another set of prominent and shadowed regions for that character. In addition, although two LED arrays have been found sufficient for obtaining an effective image of an embossed character, a greater number of light sources having different wavelength or other indicia and projected at different angles can be used. It will be realized also that distinguishing light source characteristics other than color can used with the corollary that the imaging system must be tuned to the particular light characteristics. Finally, at the cost of some processing complexity, the illuminating of the package by the multiple colors need not take place at different times. Thus, differently colored light sources can be used in a single illumination step but with the common image being filtered to provide the different color components. Horizontal and vertical edge detection are performed in much the same way by processing the red and green component light separately. In general, it has been found that single multi-colored images do not yield quite as effective a result as individual images although multiple colors offer some advantage in cases where dark ink embossed lettering appears on dark colored backgrounds.

Although not described with reference to the illustrated embodiments, it will be appreciated that the embossed character identifying system requires large local bandwidth and fast processing, I/O switching capability to adjust and sequence lighting, imaging and network connectivity between the various modules of the system.

The embodiment of the invention previously described focuses on the treatment of one surface of the drug package which, in the illustrated case, is a box. In practical terms, it is hard to predict on which surface of the box data of interest may be printed, illustrated or otherwise formed. Consequently, it is desirable to record data on all surfaces of the package. As shown in FIG. 12, in a further embodiment of the invention, an inspection station has a grip module including a set of clamping pads 48 at the end of actuating rods 50, the rods being mounted for reciprocal movement along their longitudinal axes and also for rotation about their axes. During an inspection cycle, the drug package 10 is placed in the inspection station and the grip module is actuated to have the package gripped between the clamping pads. The grip module is operated to spin the drug package about its longitudinal extent to bring the front, back and side faces of the package successively to desired positions before a package illumination module and a package image capture module. Images of the end of the package are also captured using a similar arrangement (not shown). It will be appreciated that the same effect can be achieved by either manipulating the package or manipulating the illumination and/or image capture modules.

Shown in FIG. 13 is one example of a means for generating part at least of the feedback 31, 33 of FIG. 2 to improve the confidence score of character identification. In this example, a drug package 10 at the inspection station is subjected to incremental movement along its major axes. Because light 35 from the LED array is focused close to the surface of the package 10, the incremental movement may cause a variation in the clarity of captured images depending on various factors such as depth and/or cross-sectional form of the struck embossed characters. A final position of the package for image capture is established when the perceived image is at its clearest as detected and measured by the OCR module 28. It will be understood that additional cycling of the package orientation and position and of the illumination and image capture operating parameters is effected to increase the clarity of the detected characters to the greatest possible extent.

Other variations and modifications will be apparent to those skilled in the art. The embodiments of the invention described and illustrated are not intended to be limiting. The principles of the invention contemplate many alternatives having advantages and properties evident in the exemplary embodiments.

What is claimed is:

1. In a dispenser having storage stations each containing at least one container, wherein each said container has a substantially planar outside surface with an embossed character therein and a shape and size different from that of a plurality of other said containers in respective said storage stations, a method comprising:

for each said container:
retrieving the container from the corresponding said storage station;
moving the container to an inspection station;
directing first light in a first direction across the embossed character to illuminate first parts of the embossed character;
recording first image data representing the embossed character illuminated by the first light;
directing second light in a second direction across the embossed character to illuminate second parts of the embossed character;

recording second image data representing the embossed character illuminated by the second light;

combining the first image data and the second image data to produce combined image data;

comparing the combined image data to reference data;

on the basis of the comparison, identifying the embossed character;

applying the identified embossed character as an identifying label to the container;

retrieving the labeled container from the inspection station; and moving the labeled container to one of the storage stations;

receiving, from a network, an identifier;

applying a label to the one said labeled container in one said storage station bearing the identifying label that corresponds to the identifier; and dispensing the labeled container to a user of the dispenser.

2. The method as defined in claim 1, further comprising, the first light having a first color and the second light having a second color.

3. The method as defined in claim 1, further comprising directing each of the first and the second light at a low angle of incidence to a plane of a surface within which the embossed character is formed.

4. The method as defined in claim 1, further comprising the first direction being orthogonal to the second direction.

5. The method as defined in claim 1 further comprising providing to the user information relevant to the labeled picked container dispensed to the user of the dispenser.

6. The method as defined in Claimed in claim 1, further comprising subjecting each of the first and second images to image processing prior to combining the first and second image data, wherein the image processing includes detecting character edges.

7. The method as defined in claim 6, wherein:
the first image data is scanned in the first direction to detect first character edges; and
the second image data is scanned in the second direction to detect second character edges.

8. The method as defined in claim 1, further comprising:
obtaining a supplementary image of the character and processing data representing the combined image with data representing the supplementary image;
based on the processed data, identifying the character; and
obtaining the supplementary image data using an optical character recognition (OCR) technique.

9. The method as defined in claim 1, further comprising providing a receipt for the identifier to the user of the dispenser.

10. The method as defined in claim 1, further comprising comparing the combined image data with predicted image data to derive a recognition confidence factor depending on a degree of matching of the combined image data to the predicted image data.

11. The method as defined in claim 10, further comprising adjusting imaging conditions to maximize the recognition confidence factor.

12. The method as defined in claim 10, further comprising adjusting at least one of container position and orientation to maximize the recognition confidence factor.

13. In a dispenser having storage stations each containing at least one container, wherein each said container has a substantially planar outside surface with an embossed character therein and a shape and size different from that of a plurality of other said containers in respective said storage stations, a system comprising:

for each container in the dispenser:
a mover module operable to:
retrieve the container from the corresponding said storage station; and
move the container to an inspection station inside the dispenser;
an inspection module in the inspection station inside the dispenser having a lighting sub-system for:
directing first light in a first direction across the embossed character to illuminate first parts of the embossed character; and
directing second light in a second direction across the embossed character to illuminate second parts of the embossed character;
an imaging sub-system for recording:
first image data representing the embossed character illuminated by the first light; and-second image data representing the embossed character illuminated by the second light; and
a processing sub-system having a filtering module to filter:
the first image data to obtain first edge data corresponding to the light directed in the first direction; and
the second image data to obtain second edge data corresponding to the light directed in the second direction;
a combining module for combining the first image data and the second image data to produce combined image data; and
an identification module to identify the embossed character from the combined image data;
a labeling module operable to apply the identified embossed character as an identifying label to the container;
a first retrieving module operable to retrieve the labeled container from the inspection station inside the dispenser; and
a second mover module operable to move the labeled container to one of the storage stations inside the dispenser;
a receiver module operable to receive, from a network, an identifier;
a picking module operable to pick one said labeled container in one said storage station inside the dispenser bearing the identifying label that corresponds to the identifier;
a printing and applying module operable to print and apply to the picked container, a label corresponding to:
the identifying label; and
the identifier; and
a dispensing module operable to dispense the labeled picked container to a user of the dispenser.

14. The system as defined in claim 13, further comprising, the lighting sub-system including a first light source having light output of a first color and a second light source having light output at a second color.

15. The system as defined in claim 14, further comprising the lighting sub-system having directing means to direct each of the first and the second light at a low angle of incidence to a plane of a surface within which the embossed character is formed.

16. The system as defined in claim 15, further comprising the directing means operable to direct the first light in the first direction and the second light in the second direction, the first and second directions being orthogonal to one another.

17. The system as defined in claim 13, further comprising, a loader module operable to load a plurality of said containers into respective said storage stations inside the dispenser.

18. The system as defined in claim 13, further comprising a provider module operable to provide to the user information relevant to the labeled picked container dispensed to the user of the dispenser.

19. For a plurality of dispensers in communication with a communication network, each said dispenser having storage stations, each said storage station having therein at least one container, each said container bearing embossed characters, a method comprising:

for each said container in each said dispenser:
directing a plurality of lights, each being in a different direction, across the embossed characters to illuminate a corresponding part of the embossed characters;
recording, for each said light, corresponding image data representing the embossed characters illuminated by the light;
combining the recorded image data for each said light to produce combined image data;
comparing the combined image data to reference data;
on the basis of the comparison, identifying the embossed characters;
sending the identified embossed characters in a transmission addressed for delivery to a location on the communications network;
receiving, in response to the sent transmission, a transmission from an address on the communication network and containing modified identified embossed characters corresponding to the identified embossed characters in the sent transmission; and
applying an identifying label to the container having the modified identified embossed characters; and for one said dispenser:
receiving information containing an identifier from the communications network;
applying a label to one said container that bears the identifying label that corresponds to the identifier, wherein the label corresponds to:
the identifying label; and
the identifier; and
dispensing the labeled container to a user of the one said dispenser.

20. The method as defined in claim 19, wherein each said container has:
a substantially planar outside surface with the embossed character therein; and
a shape and size different from that of a plurality of other said containers in respective said storage stations inside the dispenser.

\* \* \* \* \*